United States Patent [19]
Koff et al.

[11] Patent Number: 5,308,225
[45] Date of Patent: May 3, 1994

[54] ROTOR CASE TREATMENT

[75] Inventors: Steven G. Koff, Cambridge, Mass.; John P. Nikkanen, West Hartford; Robert S. Mazzawy, South Glastonbury, both of Conn.

[73] Assignee: United Technologies Corporation, Hartford, Conn.

[21] Appl. No.: 925,312

[22] Filed: Jul. 28, 1992

Related U.S. Application Data

[63] Continuation-in-part of Ser. No. 648,499, Jan. 30, 1991, abandoned.

[51] Int. Cl.⁵ ............................................... F01D 1/12
[52] U.S. Cl. ................................. 415/57.3; 415/57.4; 415/58.7; 415/914
[58] Field of Search ............... 415/52.1, 57.3, 57.4, 415/58.1, 58.6, 58.7, 914, 144, 145

[56] References Cited

U.S. PATENT DOCUMENTS

| | | | |
|---|---|---|---|
| 743,883 | 11/1903 | Kalbach | 415/57.4 |
| 948,692 | 2/1910 | Dodd | 415/57.4 |
| 1,349,487 | 8/1920 | Bennett | 415/57.4 |
| 2,709,917 | 6/1955 | Bruynes | 415/914 |
| 3,011,762 | 12/1961 | Pouit | 415/914 |
| 4,086,022 | 4/1978 | Freeman et al. | 415/914 |
| 4,212,585 | 7/1980 | Swarden et al. | 415/58.6 |
| 4,375,937 | 3/1983 | Cooper | 415/914 |
| 4,630,993 | 12/1986 | Jensen | 415/914 |
| 4,673,331 | 6/1987 | Kolb | 415/914 |
| 4,990,053 | 2/1991 | Rohne | 415/914 |

FOREIGN PATENT DOCUMENTS

| | | | |
|---|---|---|---|
| 11405 | 1/1977 | Japan | 415/144 |
| 504214 | 4/1939 | United Kingdom | 415/144 |

*Primary Examiner*—John T. Kwon
*Attorney, Agent, or Firm*—Norman Friedland

[57] ABSTRACT

To enhance stall margin without degrading engine performance the case of the fan of a fan-jet engine is treated by incorporating a passageway to remove flow from the main flow stream. The location and amount of the low momentum flow relative to the rotor being removed is critical. The flow is removed at a judicious location downstream of the leading edge of the rotor blade and returned at a judicious location upstream of the point of removal. The amount of removed flow must be no greater than 8% of the total flow in the fan rotor. Anti-swirl vanes in the passageway and discreetly sized inlet and outlet passages of the passageway return the flow to the main stream at an increased velocity. The intake is so designed that it selectively removes only the weak low momentum flow relative to the rotor and encourages the strong mainstream flow to remain in the main gas stream.

8 Claims, 3 Drawing Sheets

ROTOR CASE TREATMENT

This application is a continuation-in-part of Ser. No. 648,499 filed Jan. 30, 1991, which is abandoned now.

CROSS REFERENCE

The subject matter of this application is related to the subject matter of U.S. application Ser. No. 07/648,510 entitled "Case Treatment For Compressor Blades", commonly assigned and filed on even date herewith.

TECHNICAL FIELD

This invention relates to gas turbine engines and more particularly to means for enhancing stall margin of the fan without adversely impacting efficiency by incorporating a treatment to the case of the fan.

BACKGROUND ART

As is well known, surge or stall is a phenomenon that is characteristic to all types of axial flow fans and compressors and occurs at a given engine operating condition and that if gone unattended could be deleterious or harmful to not only the engine's performance but to the engine itself. Hence, throughout the entire evolution from the original design through the development and the improvement stages of a gas turbine engine, those involved in this technology pay great heed to the surge characteristics of the rotating machinery to assure that the compromise between the safe operation of the engine and its performance is optimized.

Since the point at which stall may occur limits the blades operating pressure ratio for a given corrected air weight flow and since higher pressure ratios enhance its performance, the engine's operating line is dictated by a compromise between the stall line and performance. Hence, it is always desirable to be able to raise the stall line to a higher pressure ratio for a given engine operation. For example, raising the stall line can increase the stall margin between the engine's operating line, or raising the stall line permits raising of the operating line without changing the stall margin, which obviously would result in an increase in engine's performance. Other alternatives can use up the increased stall margin with reduced rotor speed, reduced blade count, reduced rotor chord length, or eliminated variable geometry to improve component efficiency or lower component weight and complexity.

Experience has shown that because there are so many factors affecting stall it is not surprising that the stall line may not match its design point. In these situations the engine's hardware is typically modified to satisfy the stall margin requirement so as to meet engine specifications. It is also not surprising that this cannot always be done without degrading engine performance. This is not to say that there aren't other advantages that are attendant an increase in stall margin.

Thus, it is ideal to be able to increase the stall margin and at the same time obtain corresponding increase in engine performance. Of course, the next best would be to be able to increase stall margin without incurring an engine performance deficit.

As is well-known, and as to be understood for purposes of understanding the invention, rotating stall is a phenomenon that occurs whenever sufficient blades or regions of the blades stall so as to occasion a complete blockage or reversal of flow of air through the fan and/or compressor. Also flow separation on the airfoils can lead to compressor stall or rotation stall which, in turn, can lead to an overall system breakdown of the flow, i.e., surge.

Hence, whenever stall occurs and is allowed to propagate throughout the entire or nearly entire blading, surge can ensue. It is important to understand that the surge problem can be corrected by either providing means for handling an incipient surge or design the engine so that the engine never operates where a stall can manifest. For example, an incipient stall may be corrected simply by reducing engine power as compared to designing the engine so that its operating parameters assure that the engine always operates below a given stall line. Also, it is well-known in the art that surge may manifest in many different forms and stall may occur in one or more blades and at different regions. The most limiting stall characteristics often occur at the tip of the blade which essentially is the type of stall being addressed by this invention. More particularly, this invention is directed to enhance the stall line so as to avoid the manifestation of an incipient stall. This will serve to prevent compressor stall although it will be understood that the treatment of the casing does not affect whether or not a rotating stall could degenerate into a surge condition.

Treatment of the casing, which sometimes is referred to as shroud or tip seal or outer air seal, to enhance the stall line is exemplified in the prior art, for example, by U.S. Pat. No. 4,239,452 granted to F. Roberts, Jr. on Dec. 16, 1980, and assigned to the assignee of this patent application. This patent discloses that axially extending skewed grooves and circumferentially extending grooves in the blade tip shroud enhance stall characteristics.

U.S. Pat. No. 3,580,692 granted to A. Mikolajczak on May 25, 1971 also assigned to the assignee common to this patent application teaches a honeycomb structure casing treatment for enhancing the stall characteristics.

Other casing treatments that are known in the prior art are, for example, disclosed in the ASME paper reported in the Journal of Fluid Engineering Vol. 109 dated May 1987 entitled "Improvement of Unstable Characteristics of an Axial Flow Fan by Air-Separator Equipment" authored by Y. Mijake, T. Inola and T. Kato, and in a paper from The School of Mechanical Engineering, Cranfield Institute of Technology in Great Britain entitled "Application of Recess Vaned Casing Treatment to Axial Flow Compressor", dated February 1988 and authored by A. R. Aziman, R. L. Elder and A. B. McKenzie. The work presented in these papers is based in part on earlier work of S. K. Ivanov disclosed in his U.S. Pat. No. 3,189,260 granted on Jun. 15, 1965.

The Ivanov patent and the Miyski et al paper, supra, both investigate properties of air separators for industrial fans that operate at relatively low speeds and low aerodynamic loadings while the Aziman et al paper, supra, investigates properties of air separators operating at similar low speeds but with aerodynamic loadings that are encountered in aerospace applications.

In the main, the teachings disclosed in the two papers and the Ivanov patent, supra, relate to mechanisms that collect rotating stall cells in post-stall operation in a significantly large recess formed in the casing, turn and reorient the flow and then reintroduce the collected air back into the main compressor flow upstream of the rotor.

Obviously, since rotating stall is a mass of cells of stalled and highly turbulent air that precesses around the rotor at a rate that is nearly half the rotating speed of the rotor and extends upstream of the rotor a significant axial distance, one skilled in the art armed with these teachings is led to believe that in order to enhance the stall line it follows that the recess should be large enough to swallow the rotating stall. Hence, knowing that rotating stall extends a significant distance upstream of the rotor and since it is a collection of a large mass of stalled air cells, a significantly large recess would be necessary in order to swallow the rotating stall. These teachings, while particularly relevant to industrial types of fans and compressors are not relevant to aircraft application inasmuch as a large recess in the casing at the inlet of the engine or in front of a compressor is intolerable. In a sense, these papers teach away from the present invention, notwithstanding the fact that both the prior art and the present invention teach means for enhancing the stall line.

SUMMARY OF THE INVENTION

An object of this invention is to enhance stall margin of a fan of a gas turbine engine by an improved case treatment.

A feature of this invention is to provide an improved case treatment for separating low rotor relative momentum flow which has mostly a high swirl component in the absolute frame out of the main flow path and reintroducing the flow into the flow path at a higher velocity with the elimination or even reversal of the swirl component. The injected flow is to be oriented at the mean rotor blade tip angled at the point of injection to result in minimal disturbance to the freestream flow inboard of the casing.

A feature of this invention is the removal of low rotor relative momentum flow adjacent the casing of the fan rotor and reintroducing the flow back into the mainstream upstream from the removal juncture, where the amount of removed flow is no greater than 8% of the main flow in the fan.

The foregoing and other features and advantages of the present invention will become more apparent from the following description and accompanying drawings.

BEST MODE FOR CARRYING OUT THE INVENTION

As mentioned above, this invention constitutes an improvement over the axially skewed slots disclosed in U.S. Pat. No. 4,239,452, supra. It is noted that the embodiment disclosed in this patent application is directed toward the shroud that surrounds the fan of a fan jet engine, it being understood that the same principal disclosed by this concept may be equally applied to the hub supporting the fan.

It is also to be understood that the invention to be practical is limited to the particular envelope constraints of the engine to which this invention is utilized. Thus, the passages that are adapted to effectuate the invention are typically incorporated in the hardware already existing in or proposed for an engine.

Figure 1:
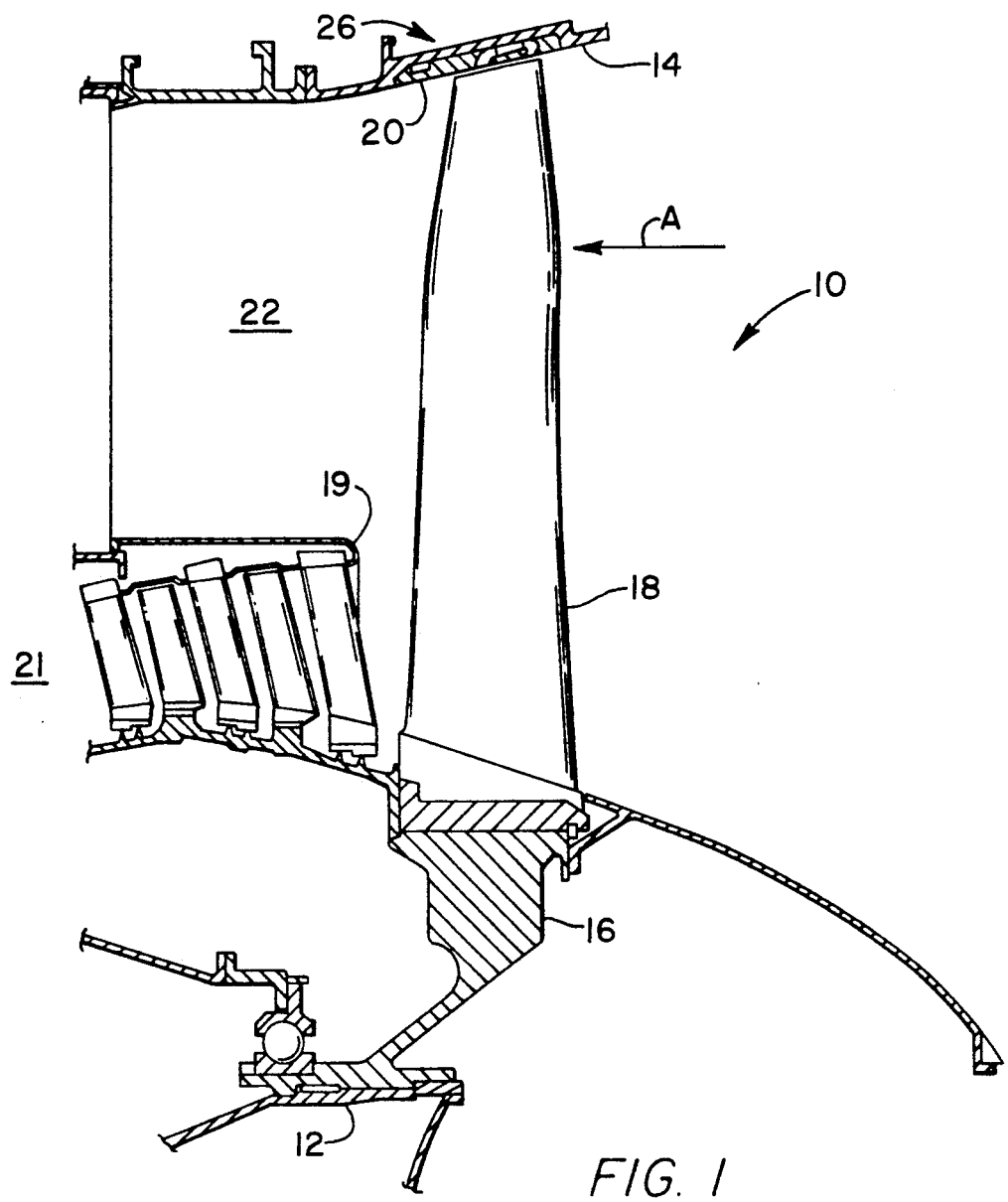
FIG. 1 is a partial view in schematic illustrating the invention as applied to the casing of a fan of a fan jet engine of the type powering aircraft.
Figure 2:
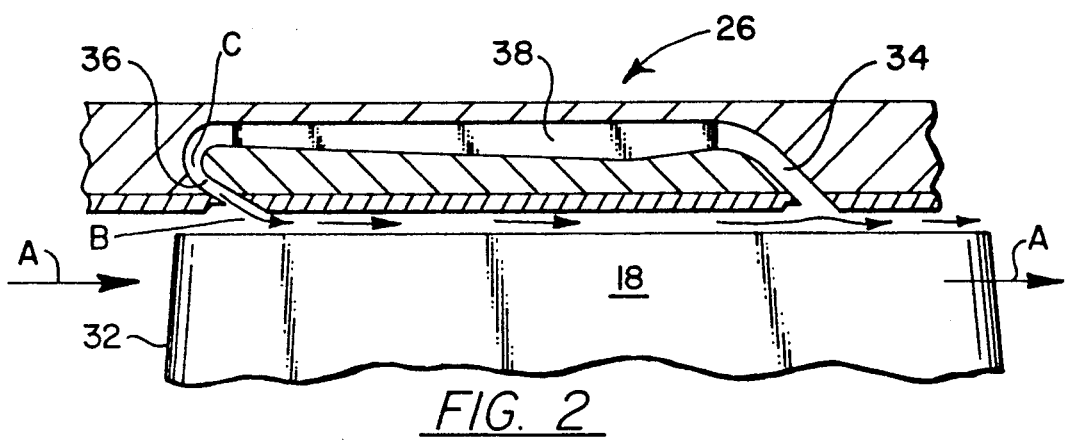
FIG. 2 is an enlarged view showing the casing treatment of FIG. 1 in schematic to illustrate the flow pattern.

The concept of this invention is best understood by referring to FIGS. 1 and 2. As shown in FIG. 1, the fan rotor generally illustrated by reference numeral 10 is attached to shaft 12 and is mounted on the front end of the engine and is surrounded by engine case 14.

The fan rotor consisting of hub 16 and a plurality of axial flow fan blades 18 (one being shown) extending radially and in close proximity to the inner diameter surface of case 14. The case 14 may carry a shroud 20 fabricated from a suitable material to form a rub strip which serves as an outer air seal for the tips of the blades 18.

Air flow out of the fan is split by splitter 19 where a portion flows into the engine case 21 and the remaining portion flows through the fan duct 22. Details of suitable engines can be had by referring to the PW4000, JT9D and F100 family of engines which are manufactured by Pratt & Whitney, a division of United Technologies Corporation, the assignee of this patent application.

As mentioned earlier, this invention is concerned with the treatment of the fan case for enhancing stall margin and is generally shown by reference numeral 26. A more detailed configuration is shown in FIG. 2 which shows the side profile of the tip portion of blade 18 in proximity to the case treatment 26. The enlarged arrow A depicts the direction of flow into the fan. Discrete passageways in the rub strip are designed to capture only the low rotor relative momentum flow, efficiently remove and sometimes reverse the swirl component, accelerate it, and reintroduce it into the fan flow stream in a nearly axial direction that is closely aligned with the fan rotor blade mean tip metal angle at the point of injection to result in minimal disturbance to the freestream flow inboard of the casing. It is abundantly important that the curvature of these passages are designed to recirculate the air as efficiently as possible and to assure the proper reintroduction of air into the fan blade stream. As noted, the fan air adjacent the tip is removed at some location downstream of the leading edge 32 of blade 18 through passage 34 and reintroduced at a location upstream of passageway 34 through passage 36. The injection position can be upstream of the rotor leading edge. A plurality of turning vanes 38 (one being shown) are circumferentially mounted intermediate passages 34 and 36. The forward facing wall formed in passage 34 is judiciously angled so that the weak axial flow near the casing, which can eventually stall the component, is selectively recirculated and injected back into the fan air stream at high velocity while strong axial flow tends to remain in the gas path and is not recirculated. This tends to avoid recirculating air more than once which can be detrimental to component efficiency.

While the particular passage configurations and dimensions will be primarily dictated by the particular application to which this invention is utilized, it is critical that the amount of flow removed from the fan stream does not exceed 8% of the total flow into the fan.

Figure 3:
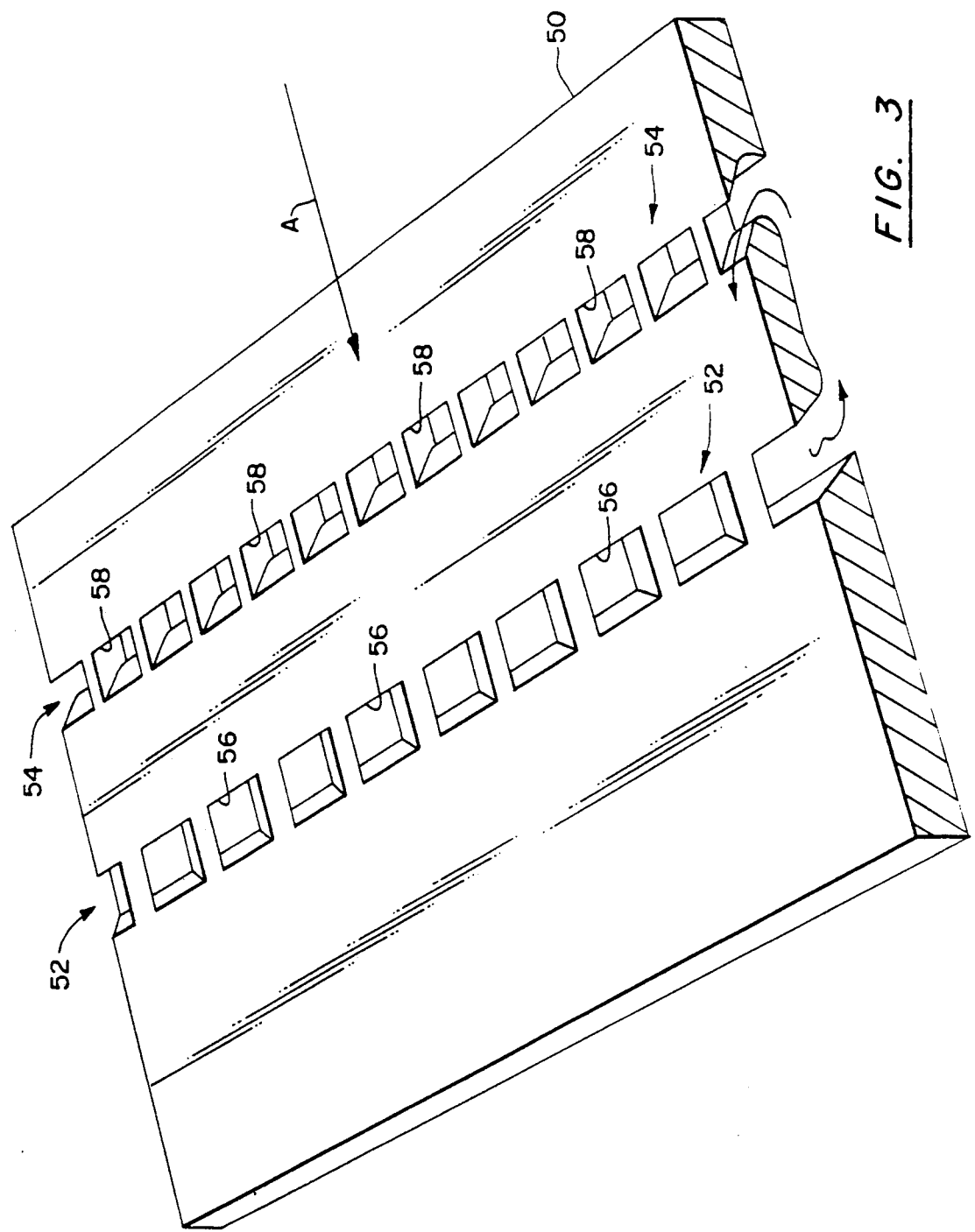
FIG. 3 is a view in perspective showing one embodiment of a case treatment incorporating the invention.
Figure 4:
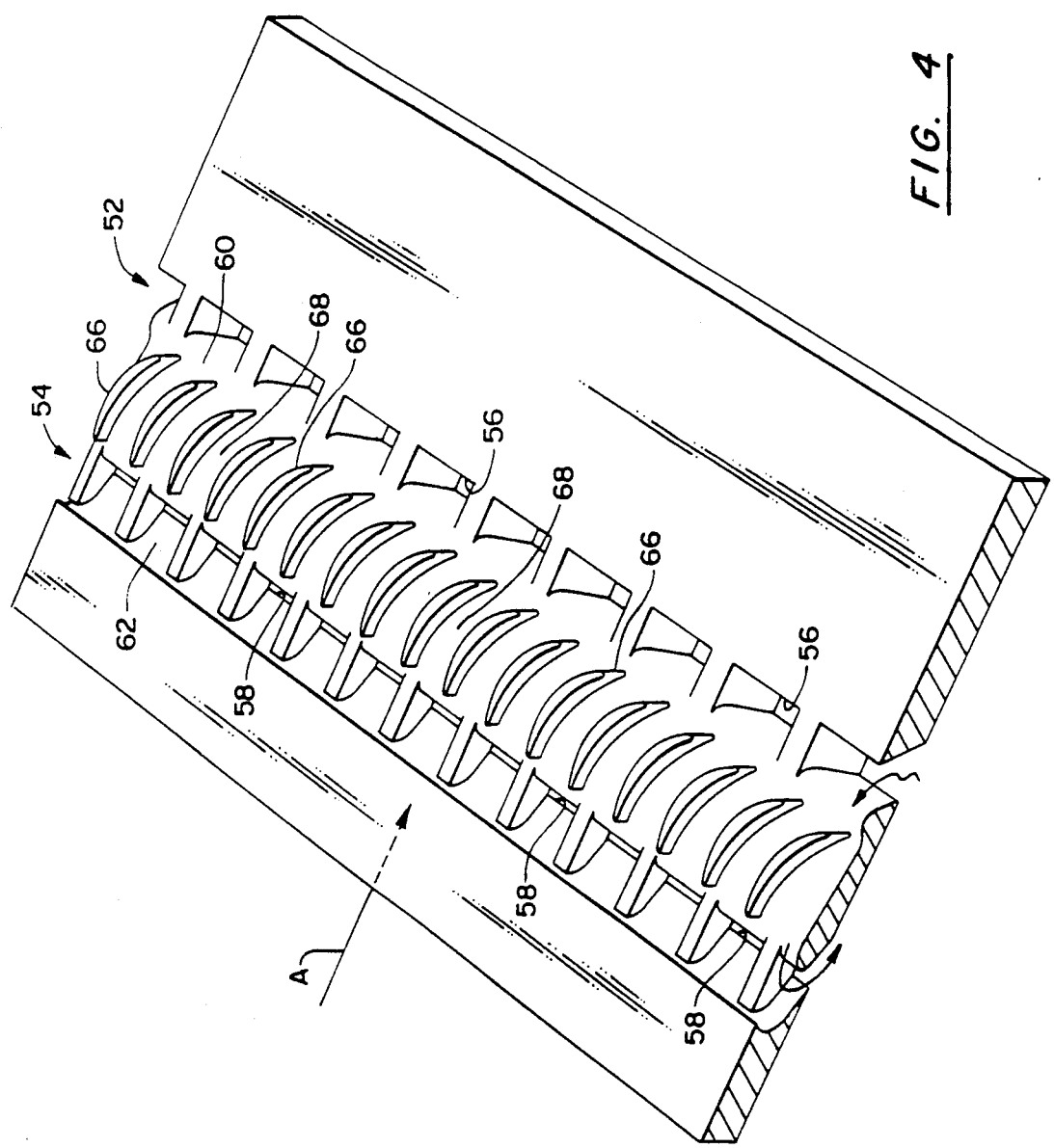
FIG. 4 is a perspective view showing the top surface of the structure of FIG. 3.

The embodiment disclosed in FIGS. 3 and 4 exemplify an integral case treatment that may be adapted as a retrofit where it is desirable to modify an existing case.

A unit formed in accordance with this design can simply be inserted into a recess formed in the inner surface of an already existing case. As shown, the passageways are formed in a ring-like element 50 having a pair of banks 52 and 54 of circumferentially spaced passageways 56 and 58 respectively which are shown as rectangular in shape. FIG. 3 is a view of the inner surface of ring-like element 50 facing the tips of the blade. The first bank 52 of passageway 56 is located to be in communication with the flow downstream of the leading edge of the fan blade and the second bank 54 of passageways 58. The back surface or outer diameter of ring-like element 50 as shown in FIG. 4 forms annular cavities 60 and 62 adjacent the passageways 56 and 58 respectively for collecting the flow and redistributing it back into the main flow stream. A plurality of vanes 66 are circumferentially disposed between the banks 52 and 54 of passageways 56 and 58, respectively, and are suitably located so as to eliminate or even reverse the swirl component of the induced air. The passageways 56 and 58 and space 68 between vanes 66 are so dimensioned to accelerate the induced air prior to being reintroduced back into the main fan airstream. The distance between banks of passageways 56 and 58 and the specific location relative to the axial extent of the blades is predicated on the particular application where the invention is being employed. Obviously, these parameters are selected in order to obtain the proper stall margin without adversely affecting fan performance. The injection ports 58 can be positioned from somewhat upstream of the rotor leading edge, to downstream of the leading edge and the intake ports must be downstream of the leading edge.

There are several design criteria that are necessary in order to achieve an efficacious vane passage treatment that will be satisfactory for aircraft application. Basically, the advantage for utilizing vane passage treatment must outweigh any deficit, particularly in view of the additional weight and manufacturing complexities. According to this invention the vane passage case treatment serves to recover the energy of the wake or defect leaving the rotor tip (or cantilevered stator parts) and turn the flow to an essentially axial direction.

Hence, the inlet 34 to the vane passage case treatment must be configured to be selective to accept more wake that core fluid. For a given static pressure depression at the intake section at inlet 34, the fluid having low axial velocity (wake) will more easily make the turn into inlet 34. The high axial velocity fluid will not achieve the tight radius or curvature required to flow into inlet 34. The design constraint will be dependent on a trail and error procedure, although the calculations based on cascade aerodynamic flow can achieve an imperial value which can be used as a base.

The design of the exit passage 36 also has no geometric constraints and one can also through known cascade fluid flow theory imperially arrive at a base design. It is, however, critical that the ratio of $\Delta P/Q$ be equal to or less than the non-dimensional value of 1.5; where $\Delta P$ equals the pressure at the discharge end of exit 18 (represented by reference letter B) minus substantially the minimum pressure of the flow measured at the junction where the flow turns leaving vanes 38 (represented by reference letter C) and Q equals $\frac{1}{2} \rho V^2$ where "$\rho$" (RHO) is the density of the fluid and "V" is the velocity of the fluid.

A test conducted to compare the effect of case treatment incorporating this invention with smooth wall surface and axial skewed grooves by simulating the aircraft installation of a commercial transport fan jet engine produced the following results. The case incorporating the invention disclosed in FIGS. 3 and 4 shows a 21 percentage points improvement of stall margin over a smooth wall casing and a 10 percentage points improvement over the axial skewed grooves. Moreover, the efficiency of the case treatment utilizing this invention exhibited one percentage point higher than the efficiency of the axial skewed grooves, and demonstrated the same efficiency as with a smooth wall.

Although this invention has been shown and described with respect to detailed embodiments thereof, it will be understood by those skilled in the art that various changes in form and detail thereof may be made without departing from the spirit and scope of the claimed invention.

We claim:

1. For rotating machine including a having circumferentially spaced blades and a case encasing said rotor for defining a flow stream that includes momentum flow including a high axial velocity of fluid flow and low axial velocity of fluid flow, a passageway in said case having an inlet passage located downstream of the leading edge of the fan blade of said fan rotor for bleeding low momentum flow relative to the rotor from the flow stream into said passageway and an outlet located at a point upstream of said inlet passage for returning said removed flow to said flow stream at a velocity that is higher than the velocity of said flow stream in said inlet passage, anti-swirl vanes in said passageway of said low momentum flow, said inlet passage flow being oriented with respect to said flow stream to selectively remove form said flow stream momentum flow relative to the rotor that has low axial velocity and to prevent the strong rotor relative flow that has high axial velocity from being admitted into said passageway, wherein said passageway is curved to direct flow backtoward said inlet passage wherein said outlet is oriented with respect to the main flow such that the ratio of the differential of the minimum pressure measured between said curved portion and said outlet passage and the pressure at said discharge end of said outlet passage to the value of $\frac{1}{2} V^2$ is equal to or less than 1.5, where " " is the density of the fluid and "V" is the velocity of the fluid.

2. For rotating machinery as claimed in claim 1 wherein the case includes an outer shroud surrounding the tips of the rotor blades, said passageway formed in said outer shroud, and said inlet passage and said outlet passage being disposed intermediate the trailing and leading edges of said blade.

3. For rotating machinery as claimed in claim 1 wherein said outlet passage faces in the direction of the flow of said main flow stream to reintroduce said removed flow back into the main flow stream in the direction of said main flow stream.

4. For rotating machinery as claimed in claim 3 wherein said inlet passage and said outlet passage include an annular opening at the end of said inlet passage and said outlet passage.

5. For a gas turbine engine having a fan rotor and means encasing the fan rotor for defining a main flow stream, a passageway in said encasing means having an inlet passage located downstream of the leading edge of the fan blade of said fan rotor for bleeding low momentum flow relative to the rotor from the main flow into said passageway and an outlet located at a point upstream of said inlet passage for returning said removed flow to said main flow at a velocity that is higher than the velocity of the flow in said inlet passage, anti-swirl vanes in said passageway of the low momentum flow and said passage flow being no greater than eight percentage points of the total flow in said main flow and said inlet passage being oriented with respect to the main flow to selectively remove from the main flow low momentum flow relative to the rotor that has low axial velocity but high absolute tangential velocity so that the strong rotor relative flow that has high axial velocity is discouraged from being recirculated in said passageway, said passageway is curved to direct flow back toward said inlet passage wherein said outlet is oriented with respect to the main flow such that the ratio of the differential of the minimum pressure measured between said curved portion and said outlet passage and the pressure at said discharge end of said outlet passage to the value of $\frac{1}{2} V^2$ is equal to or less than 1.5, where " " is the density of the fluid and "V" is the velocity of the fluid.

6. For a gas turbine engine as claimed in claim 5 wherein the encasing means includes an outer shroud surrounding the tips of the fan blades, said passageway formed in said outer shroud, and said inlet passage and said outlet passage being disposed intermediate the trailing and leading edges of said fan blade.

7. For a gas turbine engine as claimed in claim 6 wherein said outlet passage faces in the direction of the flow in said main flow stream so as to inject said removed flow into the main flow.

8. For a gas turbine engine as claimed in claim 7 wherein said inlet passages and said outlet passages include an annular opening at the end of said passages.

* * * * *

UNITED STATES PATENT AND TRADEMARK OFFICE
CERTIFICATE OF CORRECTION

PATENT NO. : 5,308,225
DATED : May 3, 1994
INVENTOR(S) : Koff et al

It is certified that error appears in the above-identified patent and that said Letters Patent is hereby corrected as shown below:

Col. 6, line 44, "$\tfrac{1}{2}V^2$" should read --$\tfrac{1}{2}\rho V^2$--

Col. 6, line 44, " " should read --"$\rho$"--

Col. 8, line 1, "$\tfrac{1}{2}V^2$" should read --$\tfrac{1}{2}\rho V^2$--

Col. 8, line 2, " " should read --"$\rho$"--

Signed and Sealed this

Thirtieth Day of August, 1994

Attest:

BRUCE LEHMAN

Attesting Officer    Commissioner of Patents and Trademarks